United States Patent
Rousselin et al.

(10) Patent No.: US 11,732,759 B2
(45) Date of Patent: Aug. 22, 2023

(54) FLEXIBLE COUPLING COMPRISING BELLOWS AND TORQUE REACTING TEETH

(71) Applicant: SAFRAN AIRCRAFT ENGINES, Paris (FR)

(72) Inventors: Stéphane Rousselin, Moissy-Cramayel (FR); Mathieu Raymond Paul Sezeur, Moissy-Cramayel (FR); Frédéric Raymond Renault, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 459 days.

(21) Appl. No.: 16/978,966

(22) PCT Filed: Mar. 7, 2019

(86) PCT No.: PCT/FR2019/050512
§ 371 (c)(1),
(2) Date: Sep. 8, 2020

(87) PCT Pub. No.: WO2019/171008
PCT Pub. Date: Sep. 12, 2019

(65) Prior Publication Data
US 2021/0003177 A1    Jan. 7, 2021

(30) Foreign Application Priority Data
Mar. 9, 2018    (FR) ........................................ 1952049

(51) Int. Cl.
*F16D 3/72*    (2006.01)
*F16D 3/06*    (2006.01)
(Continued)

(52) U.S. Cl.
CPC ................. *F16D 3/72* (2013.01); *F16D 3/06* (2013.01); *F16D 3/185* (2013.01); *F16D 3/79* (2013.01);
(Continued)

(58) Field of Classification Search
CPC ... F16D 3/72; F16D 3/06; F16D 3/185; F16D 3/79; F16D 1/0864; Y10T 403/7073
(Continued)

(56) References Cited

U.S. PATENT DOCUMENTS

| | | | | |
|---|---|---|---|---|
| 1,676,676 A | * | 7/1928 | Weiland ..................... | F16D 3/74 464/80 |
| 4,645,473 A | * | 2/1987 | Mochizuki .............. | F16D 3/387 464/79 |

(Continued)

FOREIGN PATENT DOCUMENTS

| | | |
|---|---|---|
| CH | 292 174 A | 7/1953 |
| EP | 3 130 815 A1 | 2/2017 |

(Continued)

OTHER PUBLICATIONS

International search report for PCT/FR2019/050512 dated May 10, 2019.

*Primary Examiner* — Greg Binda
(74) *Attorney, Agent, or Firm* — Sughrue Mion, PLLC

(57) ABSTRACT

A flexible coupling for coupling a first shaft and a second shaft includes a first body and a second body. The first body includes a first end to be fixed to the first shaft, a second end to be fixed to the second shaft and a first tooth, fixed to the radially inner face. The second body is secured to the first body, and has a radially outer face and a second tooth fixed to the radially outer face. The first tooth and the second tooth come into contact when a torque is applied to the first end
(Continued)

of the first body so as to transmit the torque to the second end of the first body by the intermediary of the second body.

10 Claims, 3 Drawing Sheets

(51) Int. Cl.
  *F16D 3/18* (2006.01)
  *F16D 3/79* (2006.01)
  *F16D 1/08* (2006.01)
(52) U.S. Cl.
  CPC ....... *F16D 1/0864* (2013.01); *Y10T 403/7073* (2015.01)
(58) Field of Classification Search
  USPC ........................................................ 464/79
  See application file for complete search history.

(56) References Cited

U.S. PATENT DOCUMENTS

| | | | | |
|---|---|---|---|---|
| 5,364,309 | A | * | 11/1994 | Heidrich .................... F16D 3/72 |
| 5,660,590 | A | | 8/1997 | Deperrois |
| 5,755,622 | A | * | 5/1998 | Kanki ...................... F16D 43/18 |
| 8,591,345 | B2 | * | 11/2013 | Stocco ...................... F16D 3/79 |
| 10,267,367 | B2 | * | 4/2019 | Le Ru ....................... F16D 9/10 |
| 2009/0107237 | A1 | | 4/2009 | Ramlogan et al. |

FOREIGN PATENT DOCUMENTS

| | | |
|---|---|---|
| FR | 2 728 636 A1 | 6/1996 |
| FR | 2 756 889 A1 | 6/1998 |
| FR | 2 990 011 A1 | 11/2013 |
| JP | 2002-54651 A | 2/2002 |

\* cited by examiner

FLEXIBLE COUPLING COMPRISING BELLOWS AND TORQUE REACTING TEETH

CROSS-REFERENCE TO RELATED APPLICATIONS

This application is a National Stage of International Application No. PCT/FR2019/050512 filed Mar. 7, 2019, which claims priority under U.S.C. § 119(a) to French Patent Application No. 1852049 filed Mar. 9, 2018, the entire contents of each of which are herein incorporated by reference in their entireties.

FIELD OF THE INVENTION

The invention relates to a flexible coupling device for two rotating shafts, in particular in the field of aeronautics.

TECHNOLOGICAL BACKGROUND

As part of the development of the turbojet engines, complete modules (fan section, low-pressure turbine, etc.) are mounted on a test bench to be tested. Upon mounting, as the machine to be tested and the bench constitute two independent modules, there is a systematic misalignment between the axes of rotation of the machine and of the bench and therefore a risk of not being able to couple the rotation shaft of the machine with that of the bench.

This risk is also present in the turbojet engines including a reduction mechanism (in particular between the fan section and the low-pressure shaft): it is sought to isolate the reduction mechanism to limit the transmission of the deformations and of the motive forces to the components of the reduction mechanism.

For this, couplings called flexible couplings are installed at the junction between the driving shaft and the driven shaft. The flexible couplings are well-known means for linking in rotation two shafts likely to present a misalignment of their respective axes or a deviation in the positioning of these shafts along their axes. The flexible couplings used in aeronautics must have high performances for a reduced space requirement, with however a low misalignment and a low axial offset of the shafts. Such flexible couplings, whose diameter may be less than 100 mm, commonly transmit a torque of 1,000 Nm at speeds of 20,000 revolutions/mm, at temperatures reaching 1,000° C., and must have total reliability for a predetermined service life.

These flexible couplings allow managing both misalignments between two shaft lines, but also dissociating the dynamic response of the machine from that of the bench. The flexible couplings are systematically mounted in pairs with a connecting shaft therebetween, so as to manage the misalignment between the driven shaft (machine shaft) and the driving shaft (drive shaft).

However, the flexible couplings used are often supplied from specialized manufacturers, making it difficult to control their characteristics of suppleness. Particularly, the conical rigidity (corresponding to the ratio between the misalignment torque and the angular misalignment, expressed in m·KN/radian) is never characterized by the manufacturers.

However, the value of this rigidity has a direct impact on the dynamic situation of the machine (frequency of the critical modes, loads under harmonic unbalance). The knowledge of this quantity is therefore essential when designing a turbomachine.

On the other hand, for a low conical rigidity, the flexible couplings must be supple, which goes hand in hand with lower mechanical torque strength: the more a flexible coupling is supple, the less it can transmit a torque.

In addition, the flexible couplings often consist of a stack of thin lamellae fixed on two flanges (see in particular documents FR 2 728 636 and FR 2 756 889 in the name of HISPANO SUIZA) which makes them not very axisymmetric (heterogeneous mass distribution about the axis). As a result, the balancing of these flexible couplings cannot be done finely, which leads to a limitation on the maximum speed achievable by the shafts.

Finally, as shown with the previous example of the flexible lamella couplings, due to numerous assembly elements (screws for fixing the lamellae, screws for the coupling with the shafts) the mass of the assembly is high, which can be detrimental to the overall dynamic behavior of the machine and of the test bench, or of the turbojet engine if the latter comprises a reduction mechanism. Indeed, particularly in the field of aeronautics, it is sought to minimize the mass cantilevered on the shafts to maintain the first bending mode above the maximum speed of the testing machine.

SUMMARY OF THE INVENTION

An objective of the invention is therefore to propose a new system making it possible to couple a driving shaft and a driven shaft, which can have both low conical rigidity and good torque strength while overcoming the limitations on the speed of rotation reachable by the driving shaft.

Secondly, the objective of the invention is also to propose a system which does not require an assembly element, which is simple, easy to set up and which does not require significant adaptation on the driving shaft and the driven shaft.

For this, the invention proposes a flexible coupling configured to couple a first shaft and a second shaft, said flexible coupling being characterized in that it comprises:
- a first outer coupling body substantially cylindrical of revolution about an axis, said first body including a first end configured to be fixed to the first shaft, a second end configured to be fixed to the second shaft and a connecting segment which connects the first and the second end, the first body having a radially inner face and comprising at least a first tooth, fixed on the radially inner face,
- a second inner coupling body substantially cylindrical of revolution which is disposed inside the first body while being fixed to the connecting segment, the second body having a radially outer face and comprises at least a second tooth fixed on said radially outer face.

The first tooth and the second tooth are configured to come into contact when a torque is applied to the first end of the first body in order to transmit said torque to the second end of the first body by means of the second body.

Some preferred but not limiting aspects of the flexible coupling described above are as follows, taken individually or in combination:
- the flexible coupling comprises a plurality of first teeth and as many second teeth, each first tooth being configured to come into contact with the corresponding second tooth when a torque is applied to the first end of the first body in order to transmit said torque to the second end of the first body by means of the second body.

the connecting segment comprises at least one gusset to allow displacements of the first end relative to the second end.

the first body includes a driving portion and a driven portion, the driving portion and the driven portion being connected together by means of the second body.

the at least one gusset is formed by at least one annular corrugation protruding from a radially outer face of the first body, the at least one gusset having a first wall, extending radially relative to the driving portion of the first body, a second wall fixed on the second body and an apex connecting the first wall and the second wall.

a first gusset connects the driving portion of the first body to the second body, the flexible coupling further comprising a second gusset connecting the second body to the driven portion of the first body, the flexible coupling being symmetrical with respect to a radial plane, said radial plane being normal to the axis and the first end and the second end of the first body are configured to be inserted into corresponding housings formed in the first shaft and the second shaft, respectively, and in which the first end and the second end include at least one bearing surface which extends along the axis and which is configured to bear against a wall of the corresponding housing.

the first end and the second end include at least three bearing surfaces, separated in pairs by a groove.

the first end and the second end of the first body are configured to be inserted into corresponding housings formed in the first shaft and the second shaft, respectively, and in which the first end and the second end each include at least one lug configured to penetrate into an associated slot formed in a wall of the corresponding housing, and or the first body and the second body are monolithic.

BRIEF DESCRIPTION OF THE DRAWINGS

Other characteristics, aims and advantages of the present invention will become more apparent upon reading the following detailed description, and in relation to the appended drawings given by way of non-limiting examples and wherein.

DETAILED DESCRIPTION OF ONE EMBODIMENT

Figure 1:
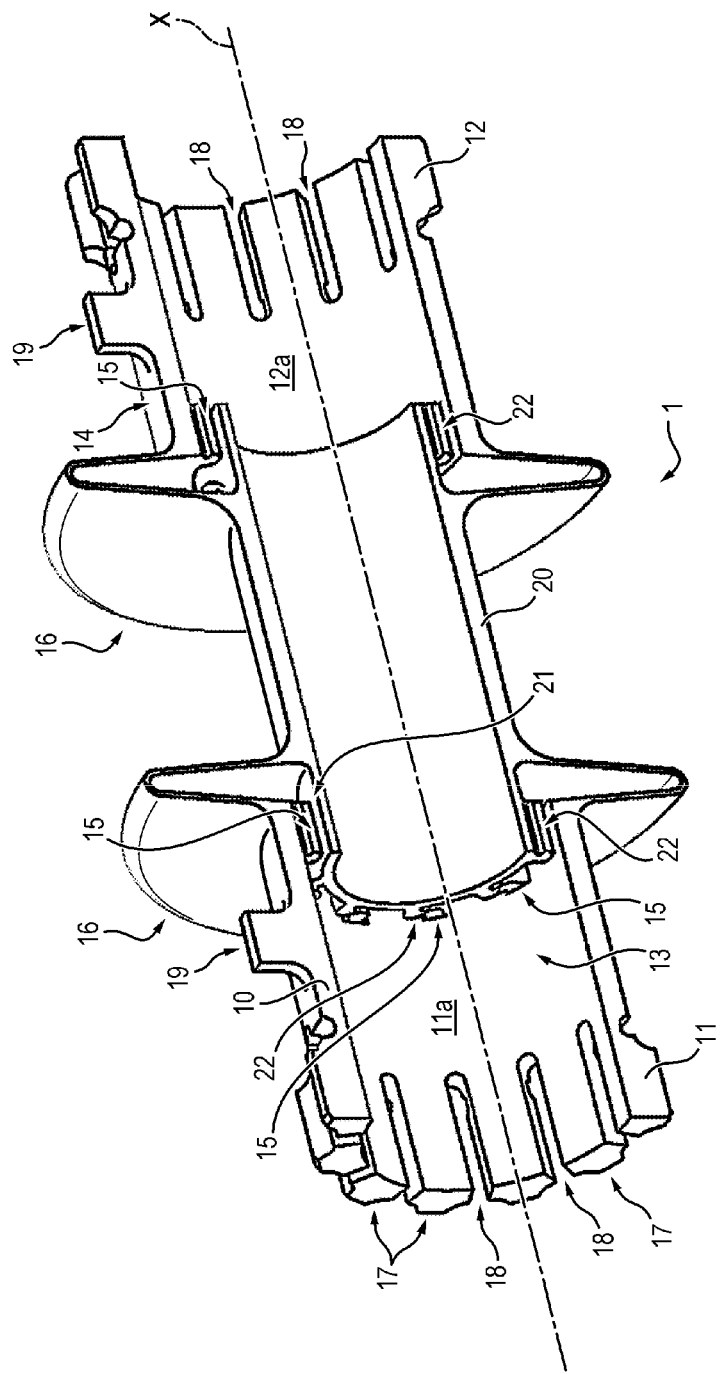
FIG. 1 is a perspective view illustrating an exemplary embodiment of a flexible coupling according to the invention.

A flexible coupling 1 according to the invention is configured to couple a first shaft, or driving shaft, to a second shaft, or driven shaft.

For this, the flexible coupling 1 comprises a first body 10 and a second body 20, the first body 10 being fixedly secured to the second body.

The first body 10 is substantially cylindrical of revolution about an axis X. It includes a first end 11 configured to be fixed on the driving shaft and a second end 12 configured to be fixed on the driven shaft. The first body 10 further has a radially inner face 13, oriented towards the axis X, and a radially outer face 14.

The second body 20 is also substantially cylindrical of revolution. It extends into the first body 10 and is preferably monolithic therewith. The second body 20 has a radially outer face 21, which extends opposite the radially inner face 13 of the first body 10. The diameter of the inner body 20 is therefore smaller than the diameter of the outer body 10.

Furthermore, in the embodiment illustrated in the figures, the first body 10 comprises a driving portion 11a, including the first end 11, and a driven portion 12a, including the second end 12. The driving portion 11a and the driven portion 12a of the first body 10 are separated from each other and are connected together by means of the second body 20.

By substantially cylindrical of revolution, it will be understood here that the first body 10 and the second body 20 have the general shape of a cylinder of revolution, except in localized areas in which they may include local projections and/or local protrusions.

In what follows, to simplify the reading of the description, the first body 10 will be referred to as outer body 10 and the second body 20 as inner body 20.

The outer body 10 comprises at least a first tooth 15, fixed on its radially inner face 13, while the inner body 20 comprises at least a second tooth 22, fixed on its radially outer face 21. The first and the second tooth 22 are configured to come into contact when a torque is applied to the first end 11 of the outer body 10 in order to transmit said torque to the second end 12 of the outer body 10 by transferring the forces through the inner body 20.

The outer body 10 may include several first teeth 15, while the inner body 20 includes as many second teeth 22, for example about ten, each first tooth 15 being configured to come into contact with an associated second tooth 22 in order to transmit a torque from one end to the other of the outer body 10 by means of the inner body 20. The first and second teeth 15, 22 are preferably equally distributed over the radially inner face 13 of the outer body 10 and the radially outer face 21 of the inner body 20, respectively.

The first and second teeth 15, 22 are formed integrally and in one piece (i.e. as an integral part) with the outer body 10 and the inner body 20, respectively.

In order to impart flexibility to the flexible coupling 1 and thus allow compensating for the axial offsets and radial and bending misalignments between the driving shaft and the driven shaft, the flexible coupling 1 further comprises a gusset 16 extending between the outer body 10 and the inner body 20 in order to authorize radial, axial and bending displacements with respect to the axis X.

More specifically, in the embodiment illustrated in the figures, the driving portion 11a and the driven portion 12a of the outer body 10 are separated from each other and are connected together by means of the gusset 16 and of the inner body 20.

Preferably, the flexible coupling 1 is symmetrical and comprises two gussets 16, a first of the gusset 16 connecting the driving portion 11a of the outer body 10 to the inner body 20 while the second gusset 16 connects the inner body 20 to the driven portion 12a.

The gussets 16 may be formed by at least one annular corrugation and protrude from the radially outer face 14 of the outer body 10. The gussets 16 therefore have the shape of a cylinder of revolution corrugated in the direction of the axis X. Here, the gussets 16 each comprise a corrugation. This is however not limiting, each gusset 16 being able to comprise a number of corrugations greater than or equal to two. Each corrugation of the corrugated cylinder has, in a manner known per se, two walls 16a, 16c inclined and connected together by a rounded apex 16b. The angle α between the two walls 16a, 16c, their thickness e as well as the height h (dimension between the apex 16b and the inner radial end of the gusset 16) is adjusted as a function of the conical rigidity desired for the flexible coupling 1. These parameters (angle α, thickness e, height h) can be determined in a manner known per se using computer-aided design software.

One of the walls 16a of the gusset 16 is connected to one of the portions of the outer body 10 while the other of its walls 16c is connected to the inner body 20. Thus, in the figures, the wall 16a of the gusset 16 which is closest to the first end 11 is connected to the driving portion 11a of the outer body 10, while the other wall 16c of this gusset 16 is connected to the inner body 20. Furthermore, the wall 16a of the gusset 16 which is closest to the second end 12 is connected to the driven portion 12a of the outer body 10, while the other wall 16c of this gusset 16 is connected to the inner body 20. The wall 16c of each gusset 16 therefore has a height h greater than the wall 16a, since the inner body 20 is housed in the outer body 10.

Figure 2A:
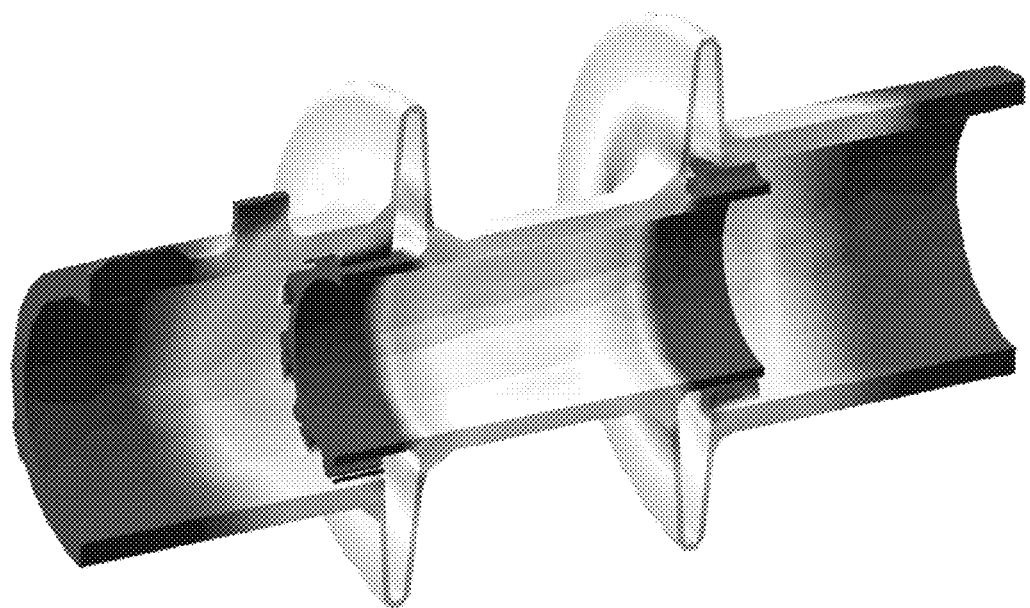
FIG. 2a illustrates the distribution of the stresses in a flexible coupling devoid of first and second teeth 22 when a torque is applied to its first and second ends.
Figure 2B:
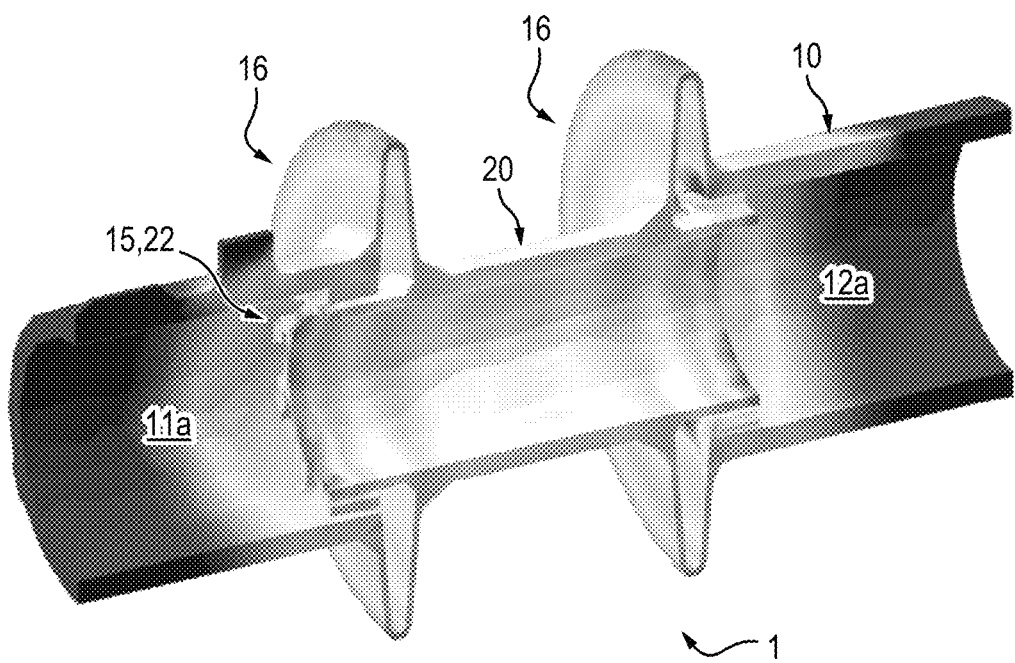
FIG. 2b illustrates the distribution of the stresses in the flexible coupling of FIG. 1 when a torque is applied to its first and second ends.
Figure 3:
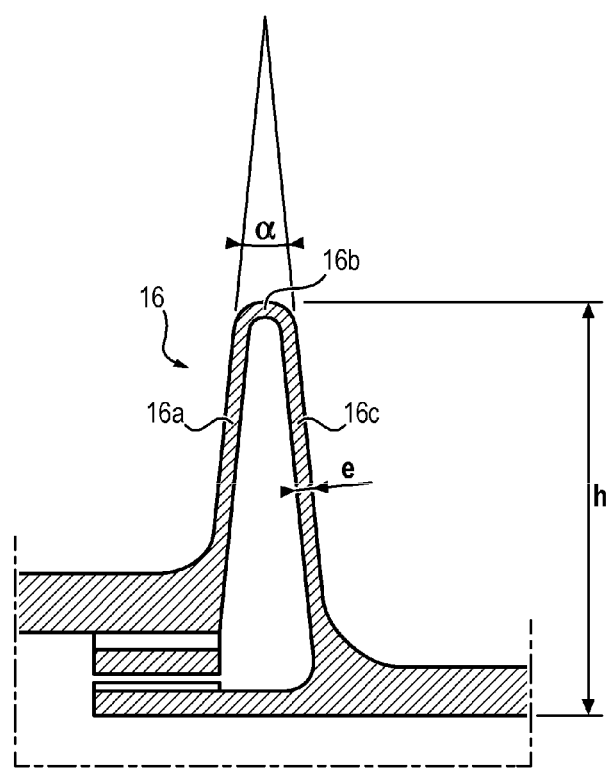
FIG. 3 is a sectional view of a gusset portion of the flexible coupling of FIG. 1.
Figure 4:
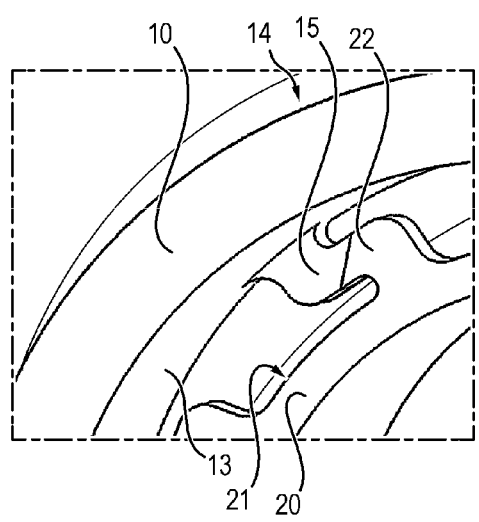
FIG. 4 is a perspective view of a first and a second tooth 22 of a flexible coupling after manufacture of said flexible coupling by additive manufacturing and before separation of said teeth.

Reference may in particular be made to FIGS. 2a and 2b which illustrate the stresses in a flexible coupling 1 devoid of teeth (FIG. 2a) and in a flexible coupling 1 according to the invention and comprising teeth 15, 22 (FIG. 2b), when a torque is applied to the first and second ends of these two flexible couplings. Particularly, it appears in these figures that, when the flexible coupling 1 is devoid of teeth, the maximum stress in this flexible coupling 1 is concentrated in its gussets 16 (FIG. 2a) where it reaches a maxima. On the other hand, when the flexible coupling 1 includes first and second teeth 15, 22, the stress is distributed in the inner body 20 without being concentrated at the gussets 16. Furthermore, the maximum value of the stress in the flexible coupling 1 according to the invention (FIG. 2b) does not reach the maxima reached by the stress in the flexible coupling 1 devoid of teeth (FIG. 2a). The first and second teeth 15, 22 therefore allow mechanically short-circuiting the gussets 16 which provide flexibility to the flexible coupling 1 when it is subjected to a torque, thereby preventing the torque from being transferred through the flexible portions and therefore limiting the torque that can be applied as well as the speed of rotation that can be reached by the driving and driven shafts. In other words, it therefore becomes possible to dimension the parameters of the gussets 16 in order to obtain the desired conical rigidity, independently of the torque strength of the flexible coupling 1.

The first end 11 and the second end 12 of the flexible coupling 1 are configured to be connected respectively to the driving shaft and to the driven shaft. For this, the driving shaft and the driven shaft each include a housing delimited by an inner wall, said housing being configured to receive the corresponding end.

In order to securely connect the flexible coupling 1 to the driving and driven shafts, the first and the second end 11, 12 of the outer body 10 each comprise at least one bearing surface 17 (preferably at least three bearing surfaces 17 in order to ensure a balancing of the flexible coupling 1), configured to come into tight contact with the inner wall of the associated housing. In one embodiment, the bearing surfaces 17 are separated in pairs by grooves 18 so that, in operation, the speed of rotation of the flexible coupling 1 generates a centrifugal force which tends to move the bearing surfaces 17 apart from the axis X, and thus reinforces the clamping of the flexible coupling 1 against the associated walls of the driving and driven shafts.

Preferably, the bearing surfaces 17 are adjusted so as to have a clearance with the wall of the associated housing on the order of 0.02 mm (to within 0.01 mm). For this, the bearing surfaces 17 can for example be reworked by lathe after characterization of the housings.

Generally, the housings are pre-existing in each shaft. Alternatively, the housings can be made specifically to receive the flexible coupling 1.

The flexible coupling 1 further includes at least one lug 19, extending radially from the radially outer face 14 of the driving portion 11a of the outer body 10 and of the driven portion 12a of the outer body 10. Each lug 19 is configured to penetrate an associated slot formed in the wall of the housing of the corresponding shaft in order to ensure a transmission of the torque between the driving shaft and the driven shaft.

Preferably, the first and the second end 11, 12 of the outer body 10 each comprise at least three lugs 19 equally distributed circumferentially on their periphery in order to ensure a balancing of the flexible coupling 1, the wall of the associated housing including at least as many complementary slots. The section of the lugs 19 is chosen as a function of the torque to be transmitted. Such dimensioning could in particular be carried out using computer-aided design software.

Preferably, the flexible coupling 1 is monolithic and unitary. Consequently, the driving portion 11a of the outer body 10, the gussets 16, the inner body 20 and the driven portion 12a of the outer body 10 are formed as an integral part so as to be formed integrally and in one piece. No assembly element such as screw, nut, lamella, etc. is therefore necessary so that the flexible coupling 1 is simple, easy to make, of low mass and able to be finely balanced. The mounting time is also reduced, since it does not require flanging or clamping.

For this, the flexible coupling 1 can in particular be made of metal by additive manufacturing, typically for example of steel. In this case, during the additive manufacturing, the first and second teeth 15, 22 can be unitary and form only one piece, then, during a second step, be separated from each other, for example by electro-erosion. It is thus possible to obtain a clearance on the order of 0.1 mm between each associated first tooth 15 and second tooth 22.

In one embodiment not illustrated in the figures, the flexible coupling 1 comprises third teeth (preferably as many third teeth as there are first teeth 15) extending from the radially outer face 21 of the inner body 20 in order to allow the use of the flexible coupling 1 in both directions of rotation. The third teeth are then positioned symmetrically to the second teeth 22 relative to the first teeth 15. In other words, each first tooth 15 is surrounded by a second tooth 22 and a third tooth. The presence of the third teeth allows the use of the flexible coupling 1 in both directions of rotation about its axis X, so that the second end 12 can be connected to the driving shaft while the first end 11 will be connected to the driven shaft.

The characteristics described in relation to the second teeth 22 are also valid for these third teeth. Likewise, the third teeth can be made during the additive manufacturing of the rest of the flexible coupling 1 by forming said third teeth integrally and in one piece with the corresponding first tooth 15 and second tooth 22, then by separating them from the first tooth 15.

The flexible coupling 1 according to the invention can therefore be easily made independently of the usual manufacturers and authorizes easy adaptation of the value of its conical rigidity according to the needs of the application.

In addition, it requires little adaptation to the driving and driven shafts to be coupled, since it is generally sufficient to make one or several slot(s) in the wall defining their housing.

The invention claimed is:

1. A flexible coupling comprising:
   an outer body substantially cylindrical of revolution about an axis, the outer body including a first end configured to be fixed to a first shaft, a second end configured to be fixed to a second shaft and a connecting segment which connects the first end and the second end, the outer body having a radially inner face and comprising at least a first tooth, fixed on the radially inner face,
   an inner body substantially cylindrical of revolution which is disposed inside the outer body and which is fixed to the connecting segment, the inner body having a radially outer face and comprising at least a second tooth fixed on said radially outer face,
   the first tooth and the second tooth being configured to come into contact with each other when a torque is applied to the first end of the outer body in order to transmit said torque to the second end of the outer body by means of the inner body.

2. The flexible coupling according to claim 1, wherein the inner body comprises a plurality of first teeth and the outer body comprises a plurality of second teeth, each first tooth being configured to come into contact with a corresponding second tooth when the torque is applied to the first end of the outer body in order to transmit said torque.

3. The flexible coupling according to claim 1, wherein the connecting segment comprises a gusset configured to allow displacements of the first end of the outer body with respect to the second end of the outer body.

4. The flexible coupling according to claim 3, wherein the outer body includes a driving portion and a driven portion, the driving portion and the driven portion being connected together by means of the inner body.

5. The flexible coupling according to claim 4, wherein the gusset is formed by at least one annular corrugation protruding from a radially outer face of the outer body, the gusset having a first wall extending radially relative to the driving portion of the outer body, a second wall fixed on the inner body and an apex connecting the first wall and the second wall.

6. The flexible coupling according to claim 4, wherein the gusset connects the driving portion of the outer body to the inner body, the flexible coupling further comprising an additional gusset connecting the inner body to the driven portion of the outer body, the flexible coupling being symmetrical with respect to a radial plane which is normal to the axis.

7. The flexible coupling according to claim 1, wherein the first end and the second end of the outer body are configured to be inserted into corresponding housings formed in the first shaft and the second shaft, respectively, and wherein the first end and the second end each include at least one bearing surface which extends along the axis and which is configured to bear against a wall of the corresponding housing.

8. The flexible coupling according to claim 7, wherein the first end and the second end include at least three bearing surfaces, separated in pairs by a groove.

9. The flexible coupling according to claim 1, wherein the first end and the second end of the outer body are configured to be inserted into corresponding housings formed in the first shaft and the second shaft, respectively, and wherein the first end and the second end each include at least one lug configured to penetrate into an associated slot formed in a wall of the corresponding housing.

10. The flexible coupling according to claim 1, wherein the outer body and the inner body are monolithic.

* * * * *